United States Patent
Vicci et al.

(10) Patent No.: US 7,191,092 B2
(45) Date of Patent: Mar. 13, 2007

(54) METHODS AND SYSTEMS FOR CONTROLLING MOTION OF AND TRACKING A MECHANICALLY UNATTACHED PROBE

(75) Inventors: Leandra Vicci, Siler City, NC (US); Richard Superfine, Chapel Hill, NC (US)

(73) Assignee: The University of North Carolina, Chapel Hill, NC (US)

(*) Notice: Subject to any disclaimer, the term of this patent is extended or adjusted under 35 U.S.C. 154(b) by 0 days.

(21) Appl. No.: 11/440,912

(22) Filed: May 25, 2006

(65) Prior Publication Data

US 2006/0229842 A1    Oct. 12, 2006

Related U.S. Application Data

(62) Division of application No. 10/786,427, filed on Feb. 25, 2004.

(60) Provisional application No. 60/449,930, filed on Feb. 25, 2003.

(51) Int. Cl.
*G01B 7/28* (2006.01)

(52) U.S. Cl. ............... 702/168; 250/306; 250/440.11; 250/442.11

(58) Field of Classification Search ............ 250/306, 250/307, 440.11–442.11; 702/167, 168; 335/296–298
See application file for complete search history.

(56) References Cited

U.S. PATENT DOCUMENTS

| | | | |
|---|---|---|---|
| 4,408,277 A | 10/1983 | Cortellini et al. | |
| 5,436,448 A * | 7/1995 | Hosaka et al. | 250/306 |
| 5,638,303 A | 6/1997 | Edberg et al. | |
| 5,698,843 A | 12/1997 | Phak | |
| 6,162,364 A | 12/2000 | Tillotson et al. | |
| 6,442,416 B1 | 8/2002 | Schultz | |
| 6,470,226 B1 | 10/2002 | Olesen | |
| 6,549,004 B1 | 4/2003 | Prigge | |
| 6,596,076 B1 | 7/2003 | Wakayama | |
| 6,716,642 B1 | 4/2004 | Wu et al. | |
| 6,881,954 B1 * | 4/2005 | Morimoto et al. | 250/306 |
| 2004/0244470 A1 | 12/2004 | Vicci et al. | |
| 2004/0262210 A1 * | 12/2004 | Westervelt et al. | 210/222 |

OTHER PUBLICATIONS

Office Action in U.S. Appl. No. 10/487,860, filed Dec. 7, 2005.

(Continued)

*Primary Examiner*—Ramon M. Barrera
(74) *Attorney, Agent, or Firm*—Jenkins, Wilson, Taylor & Hunt, P.A.

(57) ABSTRACT

Methods and systems for controlling motion of and tracking a mechanically unattached magnetic probe are disclosed. One system for controlling motion of mechanically unattached magnetic probe may include a magnetic coil and pole assembly. The magnetic coil and pole assembly includes at least one pole carrier. The pole carrier includes a light transmissive substrate and a plurality of magnetic poles being patterned on the substrate for applying force to a mechanically unattached magnetic probe. A magnetic drive core provides a return path for magnetic flux flowing between the poles. A plurality of magnetic coils are wound around the magnetic drive core for conducting current and applying magnetic force to the probe through the pole pieces. A computer maintains the position of the probe within a volume defined by an optical tracking system by moving the probe and the system under test.

17 Claims, 17 Drawing Sheets

OTHER PUBLICATIONS

Lee et al., "Microelectromagnets for the Control of Magnetic Nanoparticles," Applied Physics Letters, vol. 79, No. 20, pp. 3308-3310 (Nov. 12, 2001).

Choi et al., "An On-Chip Magnetic Bead Separator Using Spiral Electromagnets with Semi-Encapsulated Permalloy," Biosensors & Bioelectronics 16, pp. 409-416 (2001).

Choi et al., "A New Magnetic Bead-Based, Filterless Bio-Separator with Planar Electromagnet Surfaces for Integrated Bio-Detection Systems," Sensors and Actuators B 68, pp. 34-39 (2000).

Ahn et al., "Micromachined Planar Inductors on Silicon Wafers for MEMS Applications," IEEE Transactions on Industrial Electronics, vol. 45, No. 6, pp. 866-876 (Dec. 1998).

Drndić et al., "Micro-Electromagnets for Atom Manipulation," Applied Physics Letters, vol. 72, No. 22, pp. 2906-2908 (Jun. 1, 1998).

Ahn et al., "A Fully Integrated Micromachined Magnetic Particle Separator," Journal of Microelectromechanical Systems, vol. 5, No. 3, pp. 151-158 (Sep. 1996).

Ahn et al., "A Fully Integrated Planar Toroidal Inductor with a Micromachined Nickel-Iron Magnetic Bar," IEEE Transactions on Components, Packaging, and Manufacturing Technology-Part A, vol. 17, No. 3, pp. 463-469 (Sep. 1994).

Official Action dated Jul. 19, 2006 in commonly-assigned, co-pending U.S. Appl. No. 10/487,860.

* cited by examiner

NA ≈ 0.7

NA ≈ 1

METHODS AND SYSTEMS FOR CONTROLLING MOTION OF AND TRACKING A MECHANICALLY UNATTACHED PROBE

RELATED APPLICATIONS

This application is a divisional of U.S. patent application Ser. No. 10/786,427 filed Feb. 25, 2004, which claims the benefit of U.S. Provisional Application Ser. No. 60/449,930, filed Feb. 25, 2003, the disclosures of each of which are incorporated herein by reference in their entireties.

GOVERNMENT INTEREST

This work was supported by NIH Grant Number 1R01EB000761-01. Thus, the U.S. Government has certain rights to this invention.

TECHNICAL FIELD

The present invention relates to methods and systems for controlling motion of and tracking a mechanically unattached probe. More particularly, the present invention relates to magnetic structures for magnetically controlling the motion of a mechanically unattached probe in one, two, or three dimensions, where the magnetic structures are compatible with high resolution optics used for imaging and tracking.

BACKGROUND ART

In the field of scanning probe microscopy, small probes interact with samples under test to measure mechanical properties of the samples under test. For example, in atomic force microscopy, a small probe (typically sub-micrometer sized) is attached to the end of a cantilever. As the probe is scanned across the surface of a sample under test, such as the membrane of a cell, surface irregularities impose a varying force on the probe, which, in turn, results in a bending or deflection of the cantilever. An optical sensor senses the deflection of the cantilever based on light reflected from the cantilever and thereby determines changes in normal position of the probe as it is scanned across the surface of the sample under test. The changes in normal position of the probe are used to map the surface of the sample under test.

FIG. 1A illustrates a typical application of atomic force microscopy. In FIG. 1A, a probe 100 is attached to the end of cantilever 102 to map the surface 104 of a cell membrane. A laser, an optical sensor, and a computer (not shown) are used to map surface 104 as probe 100 causes deflections in cantilever 102. One problem with atomic force microscopy is illustrated in FIG. 1B. Atomic force microscopy requires a mechanical connection between probe 100 and the remainder of the system via cantilever 102. As a result, conventional atomic force microscopy is unsuitable for measuring mechanical properties of structures within enclosed regions, such as organelles within a cell membrane, or the other structures that are inaccessible for scanning with a mechanically attached probe.

One way to measure properties of structures inside of cells and other enclosed environments is to mechanically decouple the probe from the remainder of the system. However, once the probe is mechanically decoupled from the remainder of the system, tracking and controlling movement of the probe become problematic. One known technique of applying force to a mechanically decoupled probe is referred to as "optical tweezers." This technique requires high optical field intensities that interact strongly with many materials and may produce undesirable side effects on experiments in biological samples.

Commonly-assigned, co-pending international patent application number PCT/US02/30853 describes a magnetic coil and pole assembly with four pencil-shaped pole pieces that converge from the vertices of an equilateral tetrahedron. Although such an assembly is useful in many environments, it may be desirable to control the motion of a probe in microscopes having high numerical aperture (NA) objective lenses with short focal distances. For example, some lenses may have numerical apertures greater than or equal to one at focal distances on the order of millimeters. Such lenses typically have large diameters and thus limit the space for placement of magnetic pole pieces used to control the motion of mechanically unattached probes. The space for placing pole pieces is even further limited when high NA objective lenses are placed both above and below the sample under test. In addition, at some positions within the volume defined by the pole pieces in a four-pole system, moving the probe in certain directions can be difficult.

Another factor to be considered in designing and placing magnetic pole pieces to control motion of a mechanically unattached magnetic probe is that the magnetic force on the probe for a given magnetic field varies inversely with $r^5$, where r is the distance from the pole tip applying the magnetic force to the magnetic probe. Thus, in order to apply strong magnetic forces to a probe, it is desirable that the pole tips be kept as close as possible to the probe. However, because the pole tips compete for space with imaging and tracking optics, designing a system that achieves desired magnetic forces and that is compatible with high-resolution optics is difficult.

Accordingly, there exists a long felt need for improved magnetic structures for applying magnetic force to a mechanically unattached probe that are suitable for use with high resolution optics or in other space-constrained environments.

DISCLOSURE OF THE INVENTION

The present invention includes methods and systems for controlling and tracking the motion of a mechanically unattached probe. By mechanically unattached, it is meant that the probe is not mechanically attached to its motion control system. The present invention is not limited to controlling the motion of a probe that is not mechanically attached to anything. For example, a probe may be weakly bound to a surface of a sample under test and be allowed to diffuse on the surface. In another example, a probe may be bound to the surface of a sample under test and forces may be applied to the probe in a direction normal to the surface to measure the forces that bind the probe.

According to one aspect of the invention, a magnetic coil and pole assembly for controlling motion of a mechanically unattached probe is provided. The assembly includes at least one magnetic pole carrier. The pole carrier includes a light transmissive substrate and a plurality of magnetic pole pieces being patterned on the substrate in a manner for applying force to a mechanically unattached magnetic probe. A magnetic drive core is magnetically coupled to the magnetic poles to provide a low reluctance return path for the magnetic flux induced between the poles. A plurality of magnetic coils is wound around the drive core for conducting current and applying magnetic force to the probe.

In one implementation, the magnetic pole carrier comprises a slide cover slip and the magnetic poles are thin film structures patterned on the cover slip. Using a slide cover slip is advantageous because it is thin and light transmissive. Using thin film magnetic poles is also advantageous due to the thinness of the poles and the ability to fabricate the poles using semiconductor manufacturing processes. However, the present invention is not limited to using a slide cover slip for the pole plate or using thin film magnetic poles. Any light transmissive substrate and pole structure suitable for use with high numeral aperture lenses in an optical microscope are intended to be within the scope of the invention. For example, in an alternate implementation, the pole pieces may be laminated foil structures cut from a sheet of magnetic material rather than thin film structures manufactured using semiconductor manufacturing techniques.

If three dimensional motion control is desired, a hexapole pole piece arrangement may be used for the magnetic coil and pole assembly. In alternate arrangements, thin film magnetic poles may be formed in arbitrary patterns on a substrate to apply desired magnetic forces to one or more mechanically unattached magnetic probes in one, two, or three dimensions. For example, if motion in a single direction is desired, a magnetic pole and coil assembly of the present invention may include a single thin film or thin foil pole piece located on a light transmissive substrate. Locating any number of pole pieces on a light transmissive substrate is intended to be within the scope of the invention.

Accordingly, it is an object of the invention to provide magnetic structures for controlling motion of a mechanically unattached magnetic probe.

It is another object of the invention to provide a magnetic coil and pole assembly for controlling motion of a mechanically unattached magnetic probe and that is suitable for use with high numerical aperture lenses.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1A:
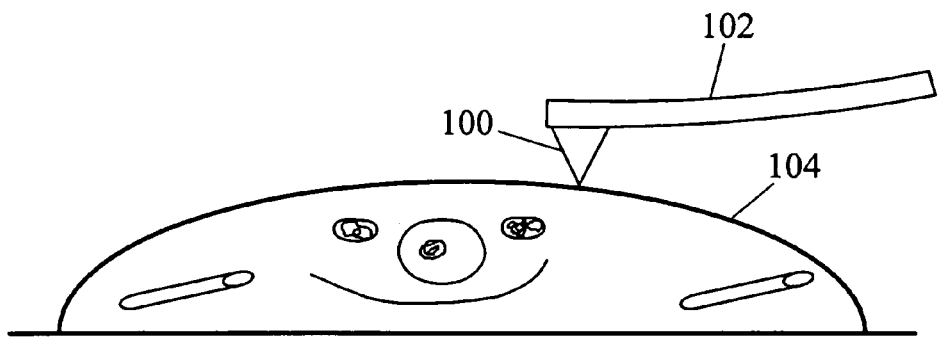
FIGS. 1A and 1B are sectional views of a biological cell and a probe associated with conventional atomic force microscopy techniques.
Figure 1B:
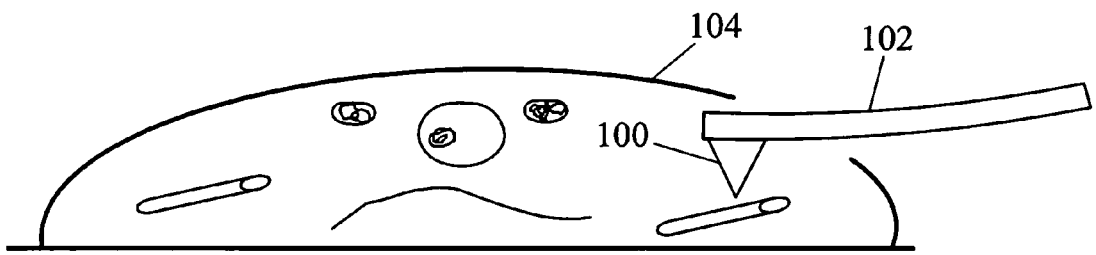
Figure 2:
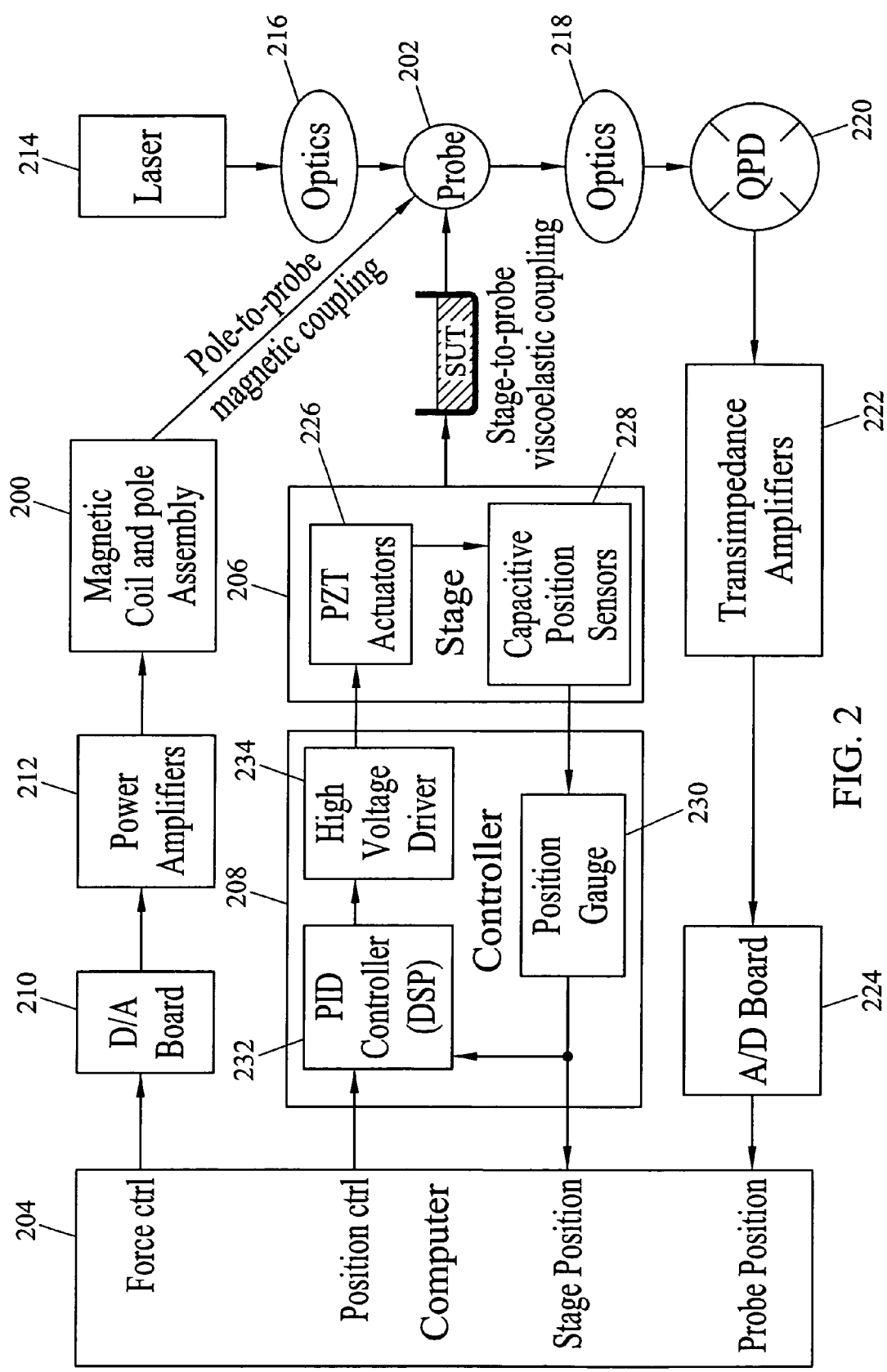
FIG. 2 is a block diagram of a three-dimensional force microscope instrument including a magnetic coil and pole assembly according to an embodiment of the present invention.

The methods and systems for controlling motion of and tracking a mechanically unattached magnetic probe may be implemented in 3D force microscopes with high numerical aperture lenses. FIG. 2 is a block diagram of an exemplary 3D force microscope in which a magnetic coil and pole assembly of the present invention may be used. Referring to FIG. 2, the system includes magnetic coil and pole assembly 200 for controlling the force applied to a mechanically unattached magnetic probe 202. The magnetic force supplied by assembly 200 is controlled by a computer 204. More particularly, D/A board 210 converts the digital coil control signal output from computer 204 into analog format. Power amplifiers 212 amplify the signal voltages output from D/A board 210 and output the amplified signals to magnetic coil and pole assembly 200 as pole magnetizing currents. Magnetic coil and pole assembly 200 transduces the pole magnetizing currents to magnetomotive forces which induce a magnetic field that is coupled to probe 202, thereby generating a magnetic force on probe 202.

The system also includes a piezoelectric (x, y, z) translation stage 206 controlling position of sample under test (SUT) 205, which physically contains probe 202. The motion of SUT 205 is coupled to probe 202 by the viscoelastic properties of SUT 205, thereby also affecting the motion of probe 202. A position control feedback loop comprises position gauge 230, PID controller 232, and high voltage driver 234 in controller module 208; and piezoelectric actuators 226 and capacitive position sensors 228 in translation stage 206. This feedback loop is used to rapidly and accurately cause the position of SUT 205 to follow a position control signal from computer 204, and to feed back a stage position signal to computer 204 representing the measured position of SUT 205.

In order to image and track probe 202, the system illustrated in FIG. 2 includes various optical components. These components may include laser 214, optics 216, and optics 218. Laser 214 generates light to be scattered from probe 202 and used to track probe 202. Optics 216 includes a series of lenses used for both tracking and imaging. Optics 218 collect light scattered by probe 202, light scattered by the sample being monitored, and light transmitted directly from laser 214. A quadrant photodiode 220 (QPD) converts the light collected by optics 218 into electronic signals used to determine the position of probe 202. Transimpedance amplifiers 222 convert the currents output by QPD 220 into voltages indicative of probe position. An A/D board 224 converts the voltages output from transimpedance amplifiers 222 into digital signals indicative of probe position. Computer 204 executes codes, which transform the probe position signals from A/D board 224 into estimates of the (x, y, z) position of probe 202 relative to the center of the beam waist of laser 214 at the focus of optics 216. The functional range of this method is limited to a radius of approximately one wavelength of the light of laser 214 from the center of the beam waist.

Maintaining the probe within this functional range is essential to the operation of the system. This is accomplished using feedback methods in various operational modes. In all modes, the feedback minimizes the estimated (x, y, z) position of probe 202 relative to the center of the beam waist of laser 214 at the focus of optics 216.

One mode in which the system illustrated in FIG. 2 may be operated is position control mode. In position control mode, computer 204 provides a desired position control signal to cause the position of SUT 205 to follow a predetermined trajectory. Computer 204 also executes feedback code driving the force control signal to cause probe 202 to remain fixed relative to the beam waist. This is equivalent to causing probe 202 to move relative to SUT 205 in a trajectory that is exactly opposite the predetermined trajectory of SUT 205. The force control signal represents the forces applied to probe 202 to cause it to follow this trajectory. This mode is useful for measuring viscoelastic properties such as fluid viscosity in SUT 205.

Another mode is force control mode. In force control mode, computer 204 provides a desired force control signal to apply a predetermined force profile to probe 202 over time. Computer 204 also executes feedback code driving the position control signal to cause probe 202 to remain fixed relative to the beam waist. This is equivalent to causing probe 202 to move relative to SUT 205 in a trajectory that is exactly opposite the motion caused by the position control signal. The position control signal represents the trajectory followed by probe 202 in response to the applied force signal.

A mode closely related to position control mode is velocity control mode. In velocity control mode, Computer 204 calculates a position trajectory satisfying initial conditions and a predetermined desired velocity profile, and uses position control mode to cause probe 202 to follow this position trajectory.

The present invention is not limited to these operational modes. Any combination of feedback from stage position and probe position signals to force control and position control signals is intended to be within the scope of the invention. In addition, the present invention is not limited to using the forward light scattering method described with respect to FIG. 2 to measure probe position. In an alternate implementation, video imaging may be used to track the position of probe 202 without departing from the scope of the invention. Using video imaging may provide further operational modes.

High NA Lenses

Figure 3A:
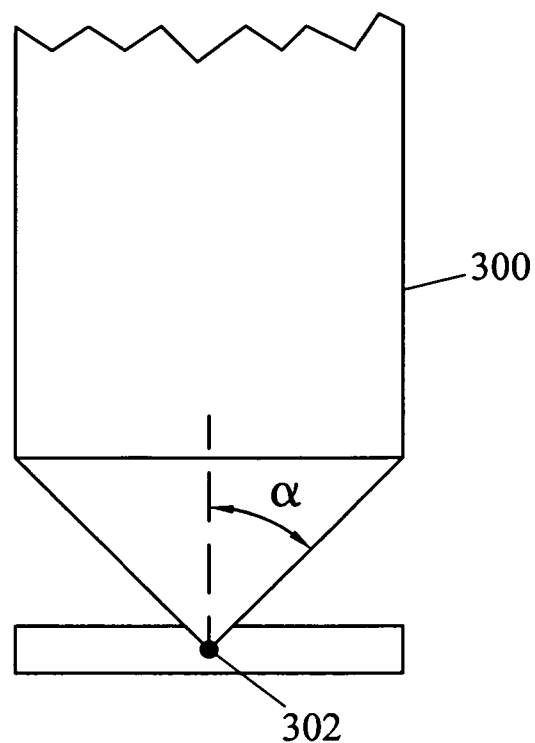
FIGS. 3A and 3B are schematic diagrams illustrating exemplary lenses having different numerical apertures.
Figure 3B:
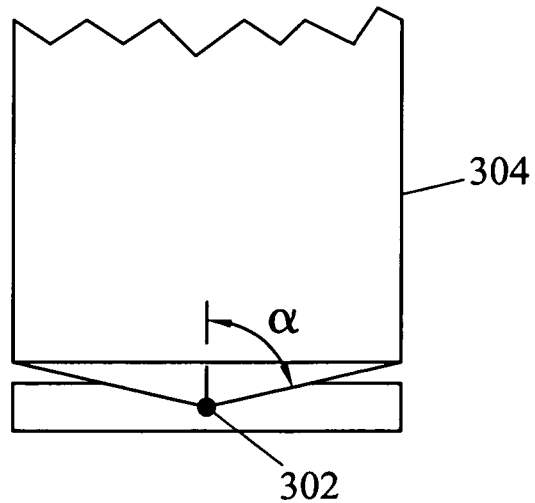

As stated above, the present invention preferably includes magnetic structures that are suitable for use with high numerical aperture objective lenses. FIGS. 3A and 3B illustrate lenses with different numerical apertures. In FIG. 3A, a lens 300 is spaced from a sample under test 302 by the focal distance of lens 300. The angle α, which is one half of the angle from the sample to the outside edges of lens 300, determines the numerical aperture. Assuming that the medium between lens 300 and sample 302 has an optical index of refraction η, the numerical aperture is equal to η sin(α). In FIG. 3B, another lens 304 has a larger diameter and shorter focal length than lens 300. As a result, the angle α and hence the numerical aperture of lens 304 is larger than that of lens 300. As the diameter of a lens increases and the focal length decreases, the numerical aperture approaches one. For lenses with a numerical aperture of one or greater, the space for placing magnetic pole pieces is limited. Accordingly, the present invention preferably includes pole piece structures that are capable of controlling motion of a magnetic probe near high numerical aperture lenses or in other space-constrained environments.

Hexapole Geometry for Magnetic Coil and Pole Assembly

Figure 4A:
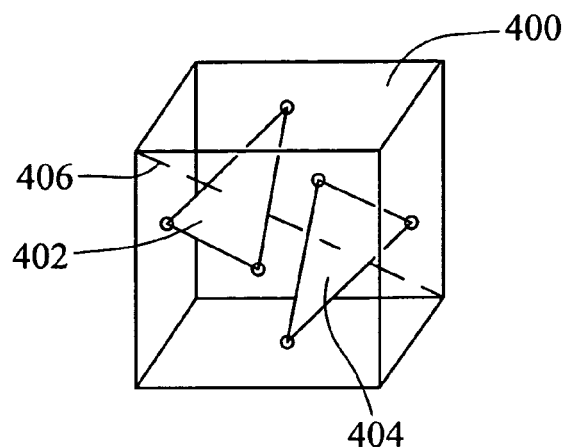
FIG. 4A is a perspective view of a cube illustrating exemplary pole placements for a hexapole design according to an embodiment of the present invention.

In some applications, it may be desirable to control the motion of a mechanically unattached probe in any direction in three dimensions. One design for magnetic coil and pole assembly 200 that is suitable for three dimensional motion control is a hexapole design. In the hexapole design, six thin film or laminated foil poles are used to control the motion of a mechanically unattached probe in three dimensions. FIG. 4A illustrates the concept behind pole placement for the hexapole design. In FIG. 4A, if a sample under test is placed at the center of a cube 400, the sample is equidistant from the midpoints of each face of cube 400. In addition, the lines that connect the midpoints of opposite faces of cube 400 are orthogonal to each other. These lines form a Cartesian coordinate system. Thus, the midpoints of the faces are ideal locations for placement of the magnetic pole tips.

Figure 4B:
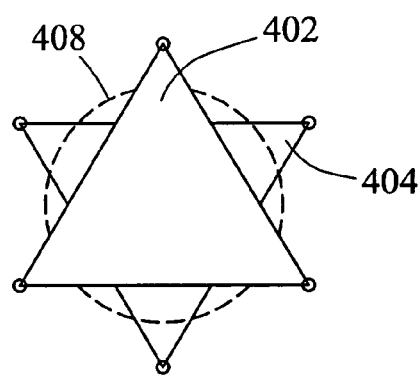
FIG. 4B is a plan view of triangles 402 and 404 viewed along line 406 illustrated in FIG. 4A.

If the midpoints of adjacent faces of cube 400 are connected as shown in FIG. 4A, two equilateral triangles 402 and 404 are formed. The equilateral triangles are parallel to each other and are rotated with respect to each other by 60°. FIG. 4B illustrates triangles 402 and 404 looking along dashed line 406 shown in FIG. 4A. In FIG. 4B, it can be seen that the vertices of triangles 402 and 404 are equidistant from the center of cube 400 in FIG. 4A. In addition, triangles 402 and 404 define a cylindrical working volume 408 between them. This working volume represents the area in which motion of probe 202 can be controlled in three dimensions. However, the present invention is not limited to controlling the motion of probe 202 in cylindrical working volume 408. For instance, it may be desirable to apply increased force on the probe at the expense of force symmetry. In such an instance, the sample may be placed near one of the pole tips for increased magnetic force.

Figure 4C:
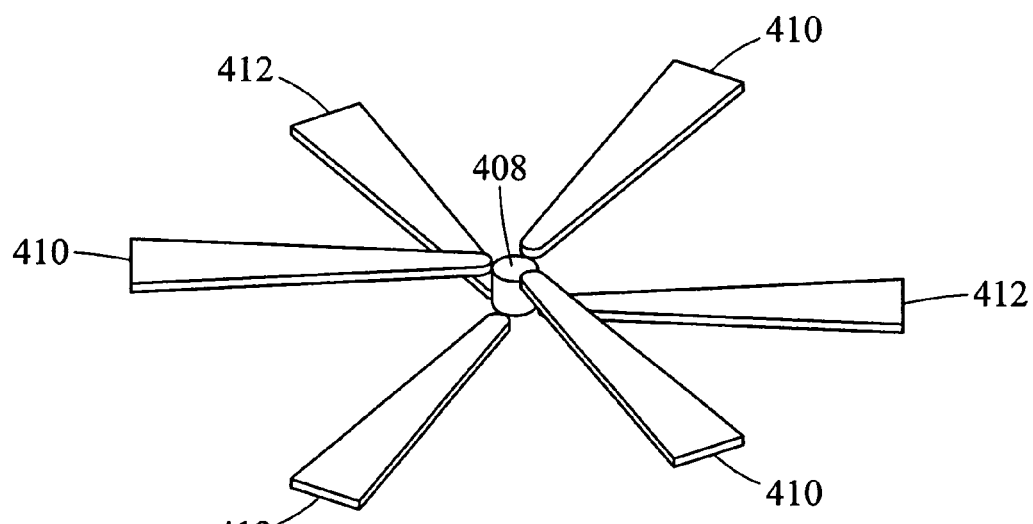
FIG. 4C is a perspective view of a hexapole arrangement for magnetic pole pieces according to an embodiment of the present invention.

FIG. 4C illustrates the result of placing thin film or laminated foil magnetic pole pieces with pole tips located at the vertices of triangles 402 and 404 illustrated in FIGS. 4A and 4B. In FIG. 4C, pole pieces 410 lie in a common plane with pole tips corresponding to vertices of triangle 402. Similarly, pole pieces 412 lie in a common plane with pole tips corresponding to vertices of triangle 404. Pole pieces 410 are rotated by an angle of 60° with regard to pole pieces 412. Like the planes that contain triangles 402 and 404, the plane that contains pole pieces 410 is parallel to the plane that contains pole pieces 412.

Figure 5A:
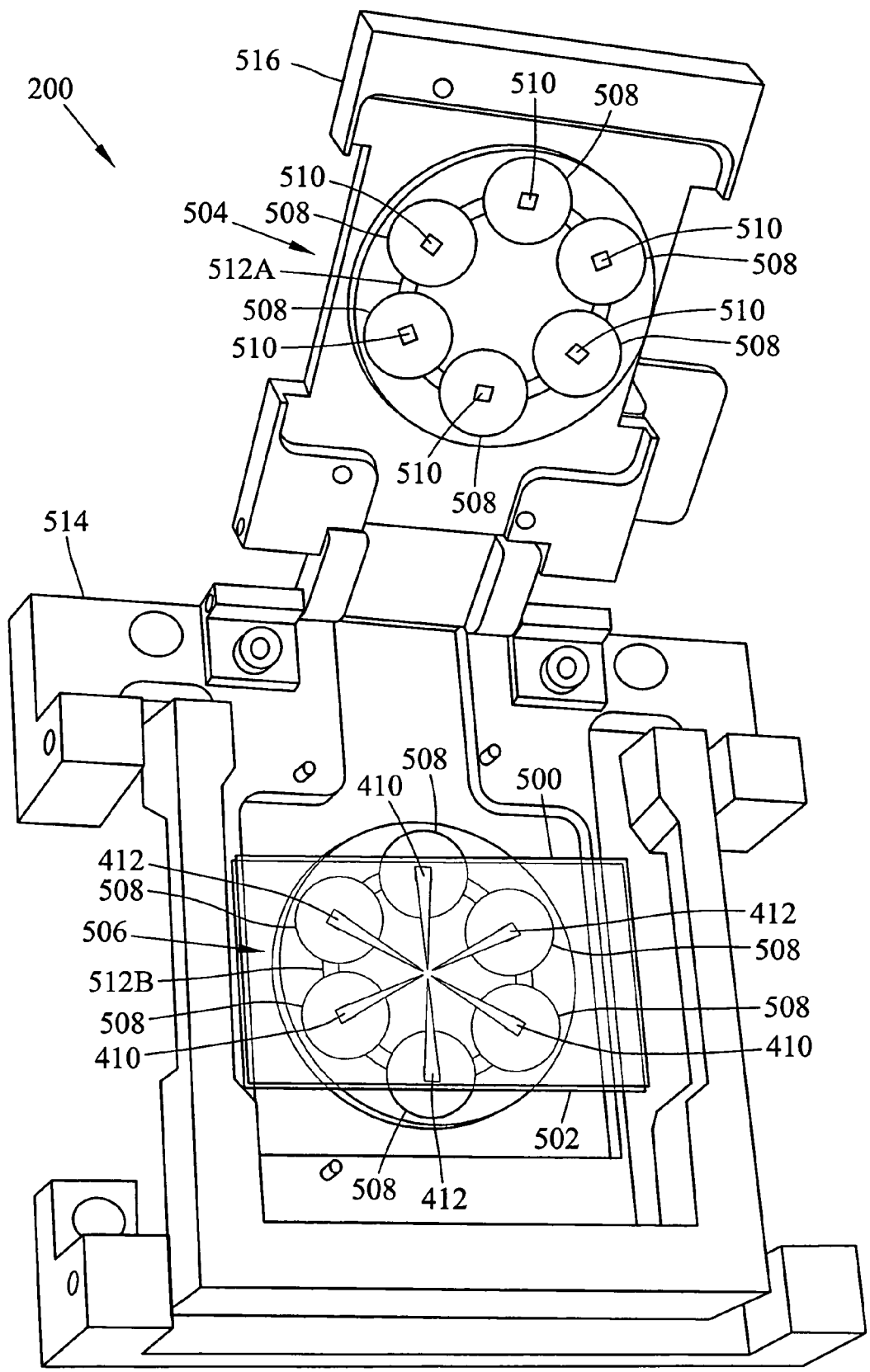
FIG. 5A is a perspective view of a magnetic pole and coil assembly according to an embodiment of the present invention.

In one exemplary implementation, the hexapole design may be implemented by providing pole pieces 410 and 412 on upper and lower carriers and providing pairs of magnetizing coils for magnetizing each pole piece. FIG. 5A is a perspective view of magnetic pole and coil assembly 200 where the assembly includes a hexapole geometry as illustrated in FIG. 4C. Referring to FIG. 5A, assembly 200 includes an upper pole carrier 500 and a lower pole carrier 502. Upper pole carrier 500 includes pole pieces 410 located on an upper surface thereof. Lower pole carrier 502 includes pole pieces 412 located on a lower surface thereof.

In order to apply magnetic force to a mechanically unattached probe, assembly 200 includes upper and lower magnetic coil assemblies 504 and 506. Assemblies 504 and 506 each include a plurality of magnetic coils 508 being wound around tabs 510 on upper and lower magnetic drive ring cores 512A and 512B. Assembly 200 may also include a mounting stage 514 for holding the cores, coils, carriers, and the sample. In the illustrated example, mounting stage 514 includes a hinged portion 516 for holding upper magnetic coil assembly 504. In operation, hinged portion 516 is closed to bring assembly 504 in close proximity to the pole pieces located on upper pole carrier 502.

Figure 5B:
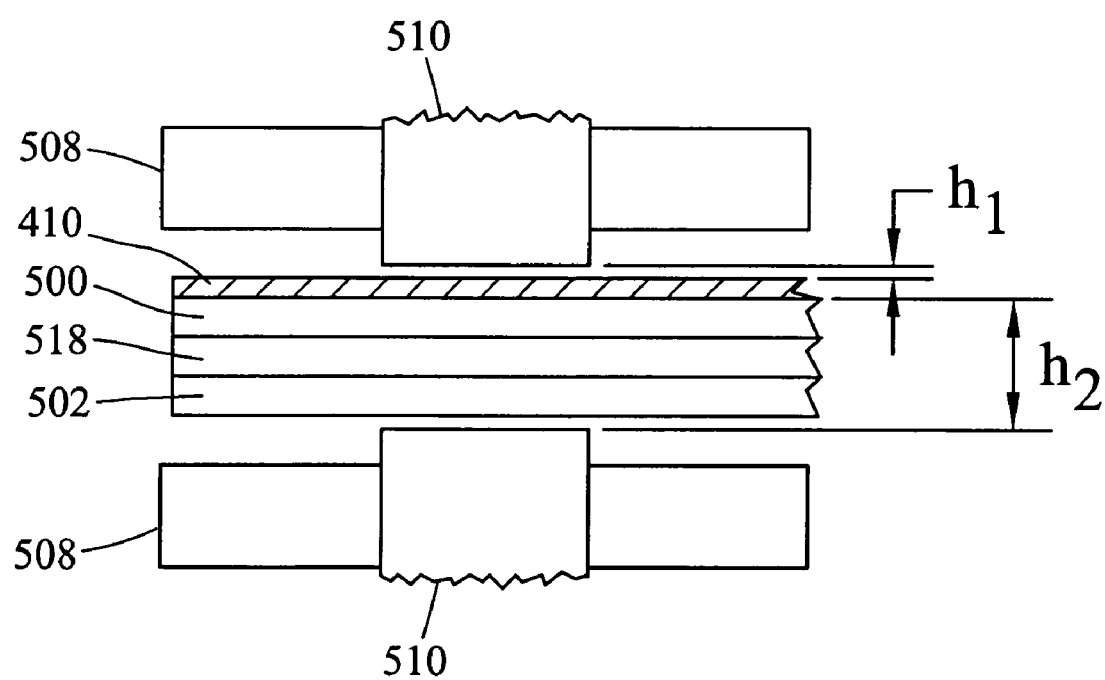
FIG. 5B is a side view of a pole piece, upper and lower pole carriers, and portions of upper and lower drive ring cores according to an embodiment of the present invention.

The surface of each tab 510 that faces one of the pole pieces 410 or 412 is referred to as a pole face. When hinged portion 516 is closed, there may be air gaps between the pole faces and the pole piece that each pole face pair is magnetizing. FIG. 5B illustrates this concept. Referring to FIG. 5B, coils 508 and associated tabs 510 are located on opposite sides of pole piece 410. The distance between the lower face of upper tab 510 and pole piece 410 is illustrated as $h_1$. The distance between lower tab 510 and pole piece 410 is illustrated by $h_2$. In order to ensure a low reluctance path for flux emanating from tabs 510 to pole piece 410, it is preferable that the distances $h_1$ and $h_2$ be much less than the cross sectional area formed by the intersection of the pole faces formed by tabs 510 and pole piece 410. For example, the cross sectional area formed by the intersection of the pole face and pole piece 410 is preferably at least one order of magnitude and even more preferably at least two orders of magnitude greater than $h_1$ and $h_2$. Providing a large cross sectional area relative to $h_1$ and $h_2$ compensates for the increase in reluctance caused by the air gap and glass material between the pole faces and pole piece 410.

Figure 6:
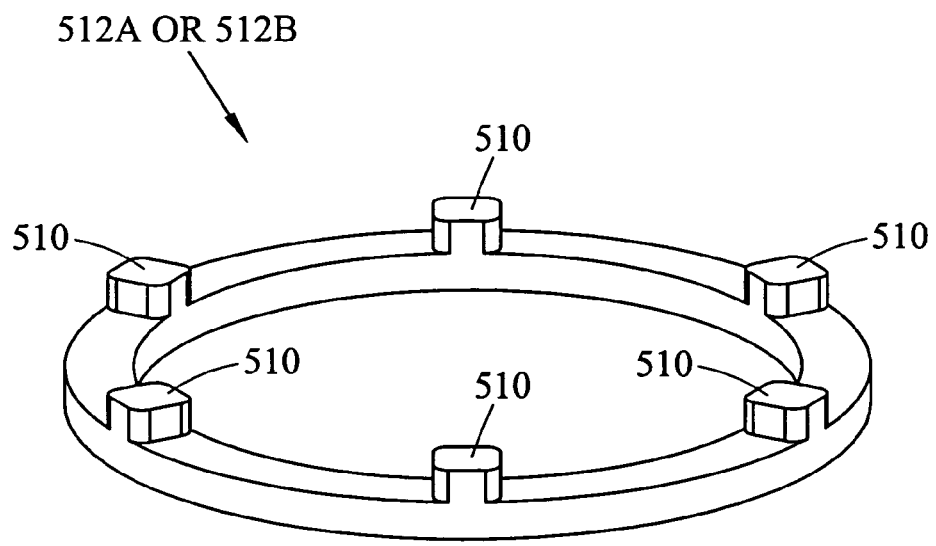
FIG. 6 is a perspective view of a magnetic drive ring core according to an embodiment of the present invention.

FIG. 6 is a perspective view of magnetic drive ring core 512A or 512B according to an embodiment of the present invention. Magnetic drive ring core 512A is preferably identical in structure to magnetic drive ring core 512B. Referring to FIG. 6, magnetic drive ring core 512A or 512B includes tabs 510 around which coils 508 may be wound. Drive ring core 510 is preferably made of a material with resistance to eddy currents, hysteresis, and magnetostriction, yet with high permeability. Such characteristics allow a large flux to be generated, while minimizing losses due to eddy currents. One material suitable for forming drive ring core 512A or 512B is tape wound laminated metglass. Tabs 510 are preferably equally spaced around core 512A or 512B.

Figure 7:
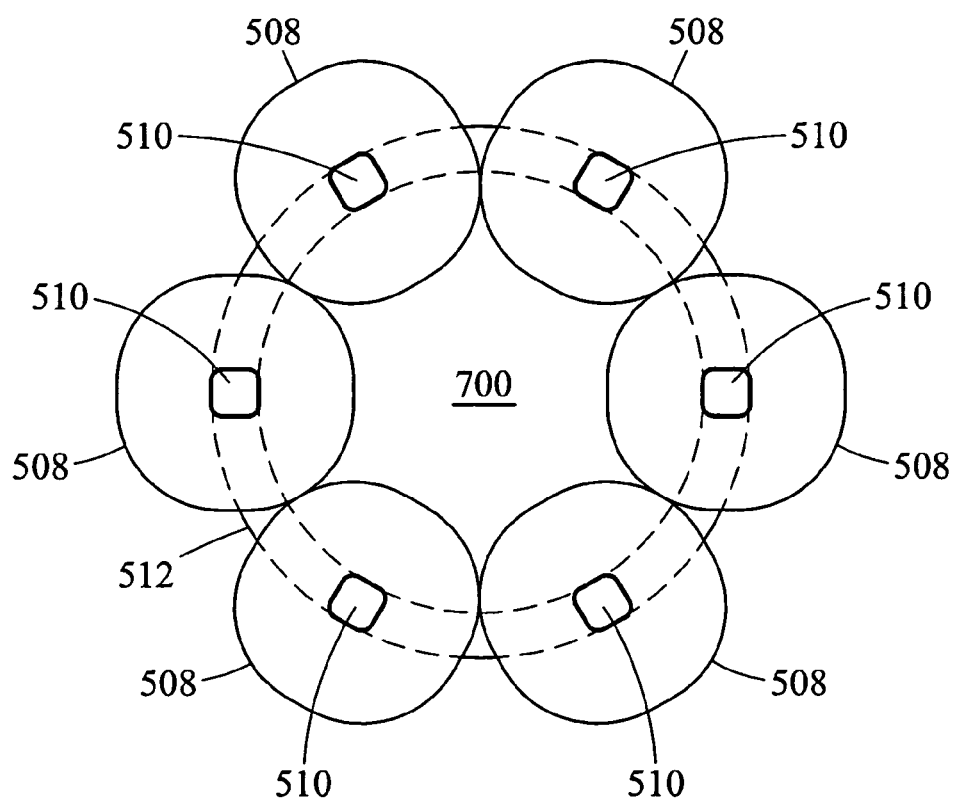
FIG. 7 is a top view of a magnetic drive ring core with magnetic coils being wound around the core according to an embodiment of the present invention.

FIG. 7 is a top view illustrating coils 508 wound around tabs 510 of core 512A or 512B. In FIG. 7, each coil is formed of a single layer spiral of flat magnetic wire. Coils 508 form an aperture 700 suitable for placement of high resolution optics. For the hexapole geometry, there are preferably six coils on each drive ring—an upper coil and a lower coil for each pole piece.

Figure 8:
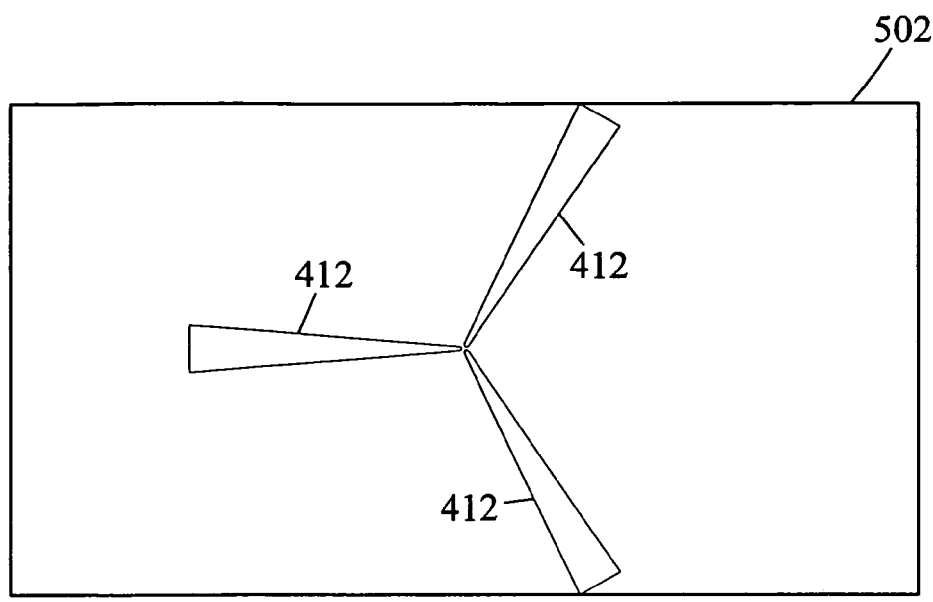
FIG. 8 is a top view of a lower pole carrier patterned with thin film magnetic pole pieces according to an embodiment of the present invention.

FIG. 8 is a top view of lower pole carrier 502 including lower pole pieces 412. In FIG. 8, lower pole pieces 412 are on the underside of pole carrier 502. In one exemplary implementation, magnetic thin films may be photolithographically patterned on glass substrates and then electroplated with permalloy to form pole plates. That is, pole pieces 410 and 412 may be patterned on glass carriers 500 and 502 to form upper and lower pole plates. In an alternate manufacturing method, pole pieces 410 and 412 may be patterned on glass carriers 500 and 502 by cutting the appropriate shapes from thin sheets of permalloy foil and then laminating the pole pieces onto carriers 500 and 502. Each pole plate may include three poles in the hexapole arrangement. As illustrated in FIG. 5A, the two pole plates make up the six poles of the hexapole geometry. The upper and lower pole carriers may be identically patterned. However, since one pole plate is flipped relative to the other pole plate, it is oriented with a rotation of 60° with respect to the other pole plate.

The present invention is not limited to using glass for pole carriers 500 and 502. Any material that is transmissive to electromagnetic energy at the wavelengths used for imaging and/or tracking is intended to be within the scope of the invention. The present invention is likewise not limited to using permalloy for pole pieces 410 and 412. Any suitable magnetic material with low hysteresis, low eddy currents, high saturation flux, and high permeability may be used without departing from the scope of the invention.

The thicknesses of pole pieces 410 and 412 may be selected based on a variety of engineering trade-offs. For example, in a configuration in which pole pieces 410 and 412 are sandwiched between upper and lower high NA objective lenses, the focal distances of the lenses, the space required for the sample slide, and the space required for pole carriers 500 and 502 limit the thicknesses of pole pieces 410 and 412. Pole pieces 410 and 412 are preferably made thick enough so that they do not saturate with magnetic flux before the flux reaches the pole tips. In a high force application where increased magnetic force is more important than three dimensional motion control symmetry, pole pieces 410 and 412 can be made thicker and located in the same plane.

Figure 9:
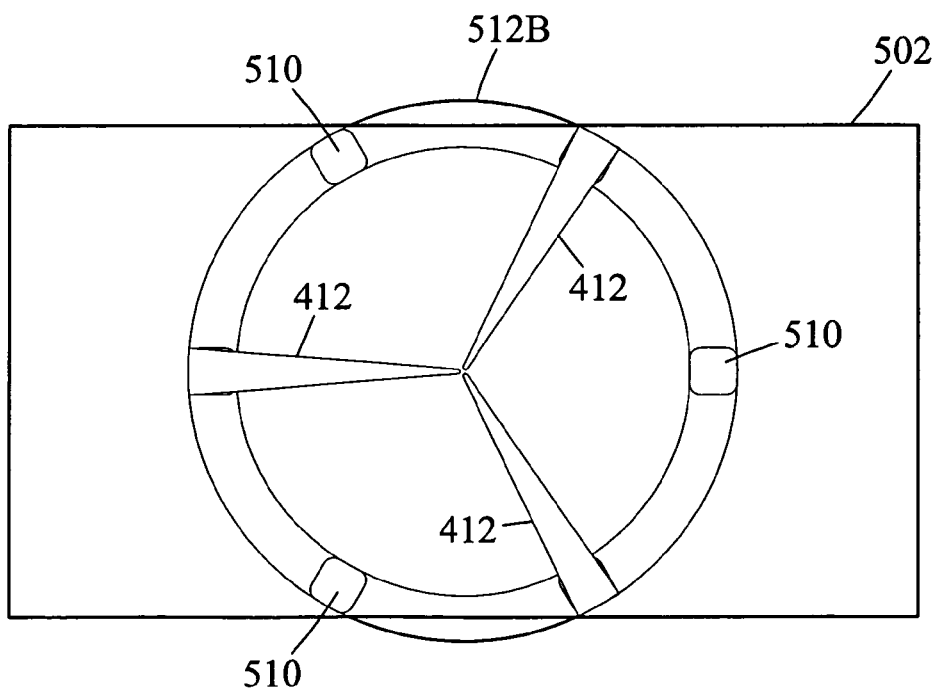
FIG. 9 is a top view of a lower pole carrier and a lower magnetic drive ring core according to an embodiment of the present invention.

FIG. 9 is a top view of lower pole carrier 502 mounted on lower drive ring core 512B. For simplicity of illustration, coils 508 are not shown. In FIG. 9, each pole piece 412 is patterned on the surface of pole carrier 502 that faces the pole faces of tabs 510. The remaining tabs of lower drive ring core 512B are used to magnetize pole pieces 410 of upper pole carrier 500 (not shown in FIG. 9).

Figure 10:
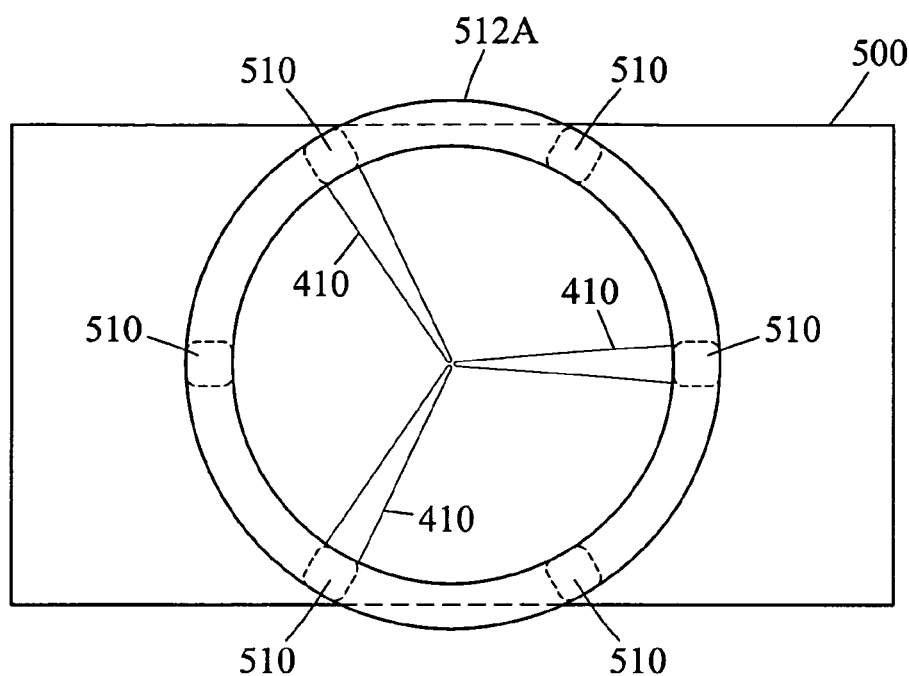
FIG. 10 is a top view of an upper magnetic drive ring core and upper pole carrier according to an embodiment of the present invention.

FIG. 10 is a top view of upper magnetic drive ring core 512A. In FIG. 10, tabs 510 are located on the lower surface of core 512A. Pole pieces 412 are patterned on the surface of pole carrier 500 that faces the corresponding pole faces of tabs 510. The remaining tabs 510 are used to magnetize coils 412 on lower pole carrier 502. In the configuration illustrated in FIG. 11, each pole piece 410 and 412 is sandwiched between two tabs 510 to provide a low reluctance path for magnetic flux.

Figure 11:
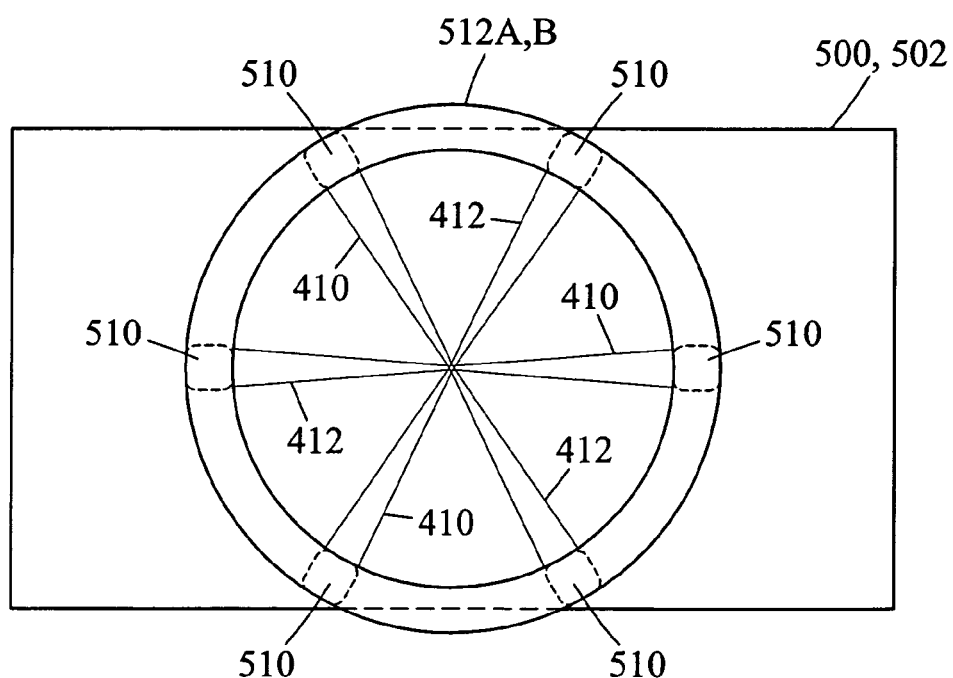
FIG. 11 is a top view of upper and lower magnetic cores and upper and lower magnetic pole carriers according to an embodiment of the present invention.

FIG. 11 is a top view of upper and lower magnetic pole carriers 500 and 502 and upper and lower drive ring cores 512A and 512B in a sandwiched configuration. It can be seen from FIG. 11 that when pole carrier 500 is placed on top of pole carrier 502, pole pieces 410 and 412 form the hexapole geometry. Although not illustrated in FIG. 11, a specimen slide may be placed between upper and lower pole carriers 500 and 502. The specimen slide may include a mechanically unattached probe located in an aqueous medium so that magnetic force can be applied on the probe using pole pieces 410 and 412.

Figure 12:
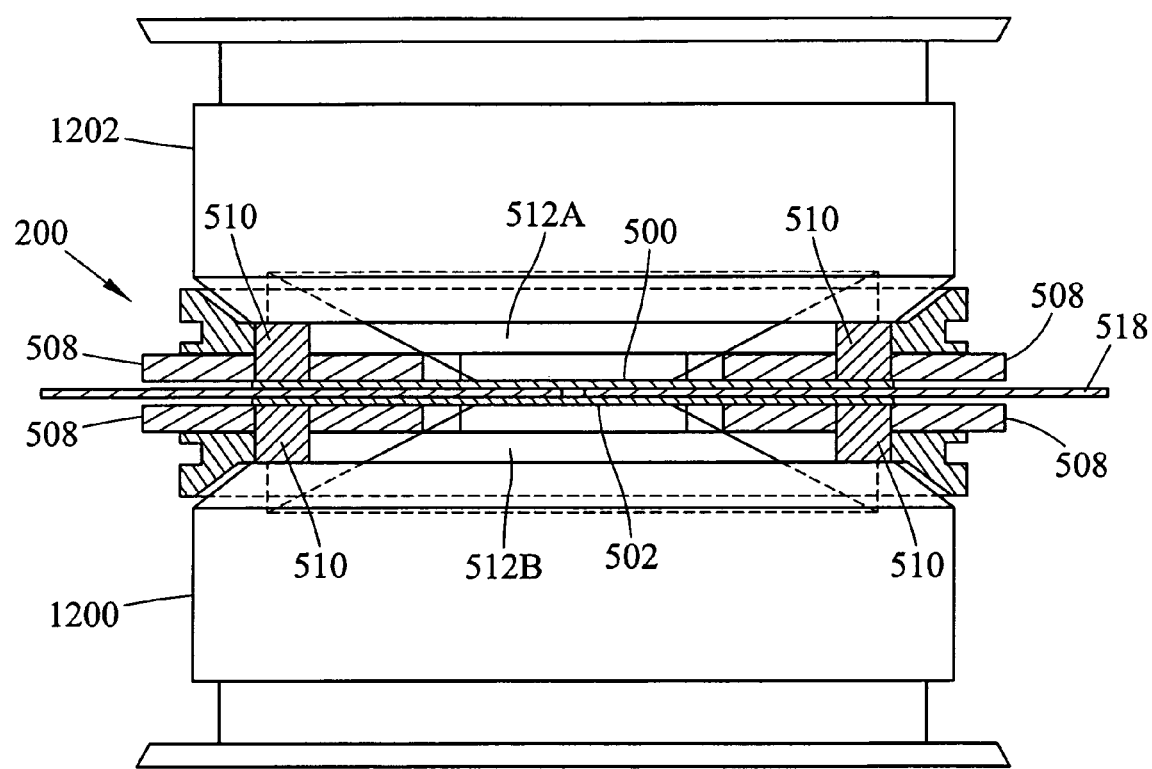
FIG. 12 is a side view of a magnetic coil and pole assembly and upper and lower objective lenses according to an embodiment of the present invention.

FIG. 12 is a side view of magnetic coil and pole assembly located in a space-constrained environment with high NA lenses on opposite sides of the assembly according to an embodiment of the present invention. Referring to FIG. 12, upper and lower pole carriers 500 and 502 are located on opposite sides of sample plate 518. It can be seen that due to the compact configuration of the upper and lower pole carriers, a lens 1200, which may be a high numerical aperture lens (NA≧1), may be placed in close proximity to the sample. Another lens 1202, which may also be a high NA lens, may be placed above assembly 200. In an alternate configuration, either lens may be replaced by a lower NA lens (NA<1) without departing from the scope of the invention. The gaps between lenses 1200 and 1202 and the respective pole carriers may be filled with a predetermined material to increase the numerical aperture of the lenses. In one example, the predetermined material may be water. The sample under test may be imaged through lower pole carrier 502. The tracking laser may also pass through lower objective lens 1200, lower pole plate 502, upper pole plate 500, and into lens 1202.

In order to drive one of the pole pieces 410 or 412, it is desirable to magnetize the upper and lower coils 508 above and below the pole piece being magnetized so that each coil has the same magnetic sense in the direction of the pole piece. That is, the upper and lower coils for a particular pole piece are preferably magnetized so that the north poles or the south poles of the coils face each other. This may be accomplished by wiring coils in the same vertical stack in series and winding the coils in opposite directions so that a current flowing in a given direction in each coil pair results in either the north or south poles facing each other.

Magnetizing the coils so that like poles face each other directs magnetic flux in the direction of the pole tip of the pole piece and into the sample. The flux may return through the other pole tips and the drive ring cores. It should be noted that it is not desirable to magnetize coils in the same vertical stack so that unlike poles face each other. For example, if a north pole in a vertical coil stack faces a south pole, flux emanating from the north pole will terminate in the south pole, rather than flowing through the pole piece. This is undesirable since less flux will reach the magnetic probe.

Figure 13:
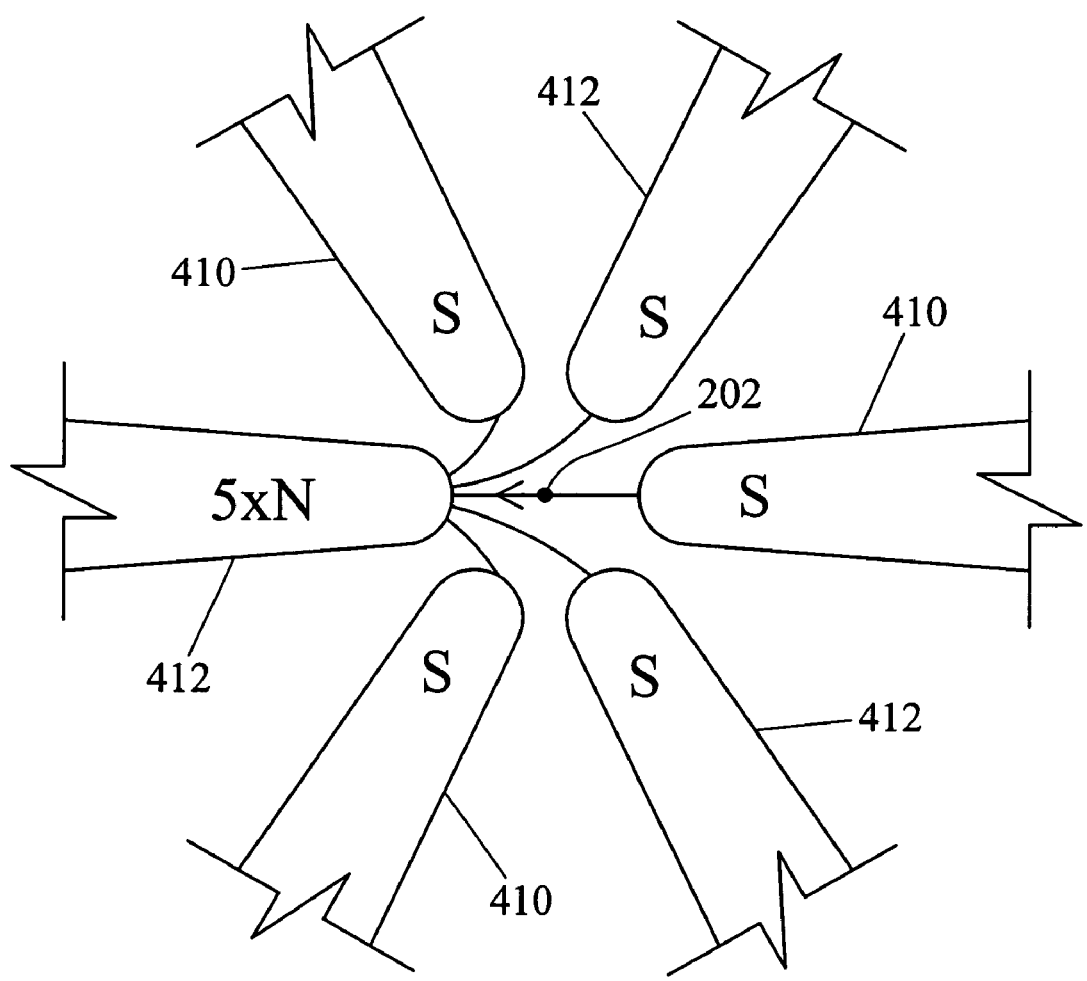
FIG. 13 is a top view illustrating exemplary magnetic forces that may be used to pull a probe towards one pole piece in a hexapole arrangement according to an embodiment of the present invention.

In order to effect motion towards one of the pole pieces, the pole piece may be energized with a magnetic force that is stronger in magnitude than the magnetic force of the other pole pieces. In addition, the magnetic sense of the pole piece towards which motion is desired is preferably opposite that of the other pole pieces. FIG. 13 illustrates this concept. Referring to FIG. 13, one pole piece 412 is preferably magnetized with a magnetizing force of 5 N, indicating a strong magnetic force with a north magnetic sense. The remaining pole pieces are preferably magnetized with weak south fields S, where S represents a field that is equal in magnitude to N. Probe 202 will travel in the direction of increasing magnetic flux. In FIG. 13, the probe will travel in the direction of the 5 N pole piece. By utilizing different magnetizing currents and the geometry illustrated in FIG. 5A, motion of probe 202 in three dimensions can be achieved.

Alternate Pole Piece Geometries

Figure 14A:
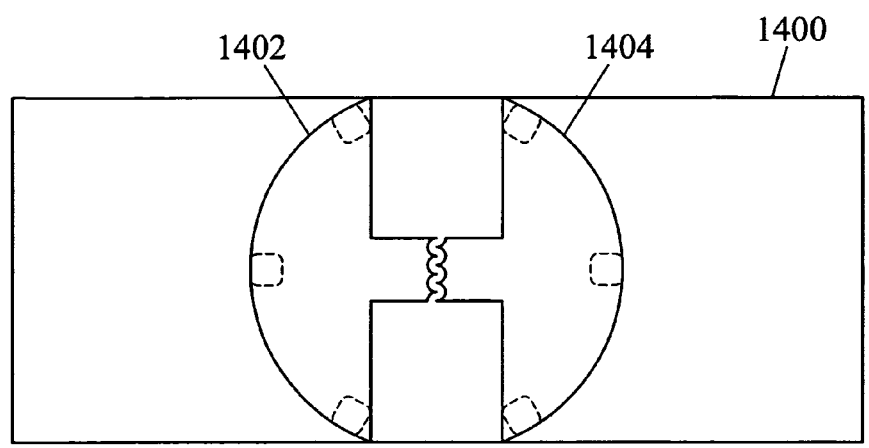
FIG. 14A is a top view of a pole carrier including peaked magnetic pole pieces according to an embodiment of the present invention.
Figure 14B:
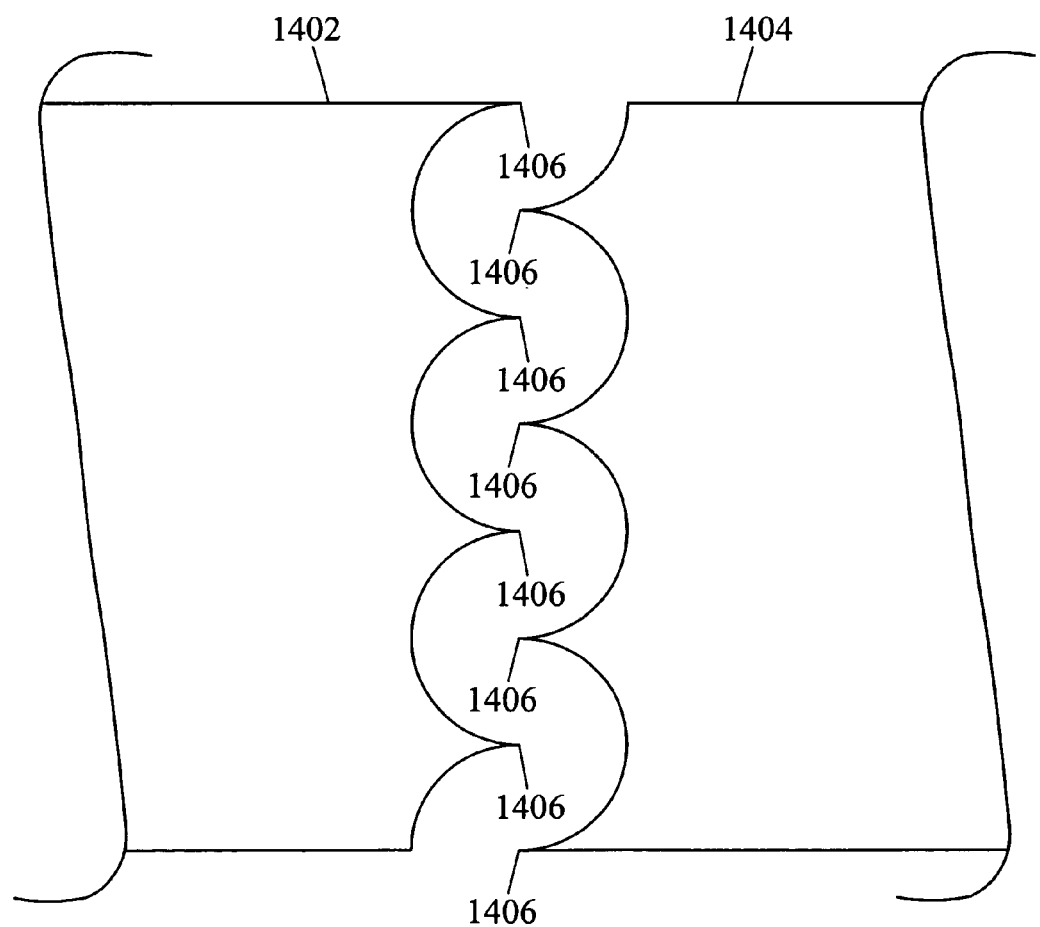
FIG. 14B is a close-up view of the pole carrier with peaked magnetic pole pieces illustrated in FIG. 14A.

Although the examples described above with regard to FIGS. 4A through 13 illustrate a hexapole design, the present invention is not limited to using a hexapole design. Forming any thin film or thin foil pole piece structure on a pole carrier to achieve a desired magnetic force on one or more mechanically unattached probes is intended to be within the scope of the invention. FIG. 14A is a top view of a pole carrier 1400 with an alternate pole piece configuration. FIG. 14B is a close-up view of the pole pieces and pole carrier illustrated in FIG. 14A. In FIGS. 14A and 14B, pole carrier 1400 may be a glass substrate, as described above. In FIG. 14, pole carrier 1400 includes pole pieces 1402 and 1404. Pole pieces 1402 and 1404 may be thin films or thin foils formed in a peaked or sawtooth pattern to form a plurality of opposing pole tips 1406 for applying forces over a wide area of a sample. Pole pieces 1402 and 1404 may be coupled to coil and pole assembly 200 at locations indicated by dotted lines in FIG. 14A. Pole tips 1406 may be magnetized in any suitable manner to apply force to a plurality of mechanically unattached probes. For example, pole tips 1406 on pole piece 1402 may be initially magnetized to have a north magnetic sense and pole tips 1406 on pole piece 1404 may be initially magnetized to have a south magnetic sense. A plurality of magnetic probes may be placed between the pole tips in the sample under test. The magnetic polarity of the pole tips may be alternated over time and the force response of the sample under test may be measured over a period of time.

Imaging Optics

Figure 15A:
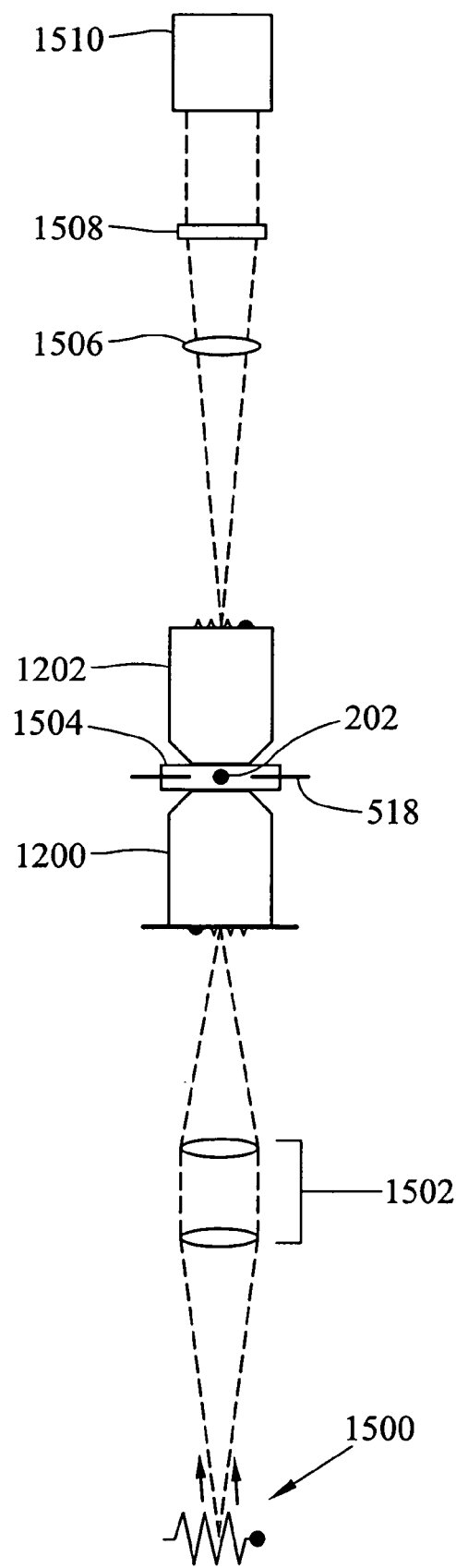
FIG. 15A is an optical schematic diagram illustrating exemplary imaging optics suitable for imaging a mechanically unattached magnetic probe according to an embodiment of the present invention.

As discussed above, the present invention may include imaging optics for viewing probe 202 in the sample under test. FIG. 15A is an optical schematic diagram of exemplary imaging optics suitable for use with the methods and systems of the present invention. Referring to FIG. 15A, the imaging optics include a light source 1500 for illuminating the object being imaged. Light source 1500 may be any suitable light source capable of uniform illumination of an object. In a preferred embodiment, light source 1500 is a fiber light consisting of a halogen lamp and a bundle of optical fibers with the output coupled to the lower end of the imaging optics. An exemplary commercially available light source suitable for use with the present invention is the M1000 Fiber Light available from Edmond Optics.

In a preferred embodiment of the invention, Koehler illumination is used to illuminate the subject. In Koehler illumination, light from the light source is focused by a collector lens to form an image of the light source on the back focal plane of a condenser. Accordingly, in FIG. 15A, collector lenses 1502 form an image of light source 1500 on the back focal plane of a condenser 1200. Condenser 1200 is an objective lens that corrects for spherical aberration, coma, and chromatic aberration and is optimized for bright field illumination. Probe 202 being imaged is located at the focal point of condenser 1200 in a sample chamber 1504. Upper objective lens 1202 forms an image. A tube lens 1506 focuses the lights rays exiting objective 1202 onto the image plane of a CCD camera 1510. A filter 1508 filters the light entering CCD camera 1512. CCD camera 1510 converts the incident photons into an electronic signal and produces an electronic image of probe 202 and the sample under test.

The imaging system illustrated in FIG. 15A is referred to as a bright field imaging system. However, the present invention is not limited to using bright field imaging. For example, in an alternate embodiment of the invention, fluorescent imaging can be used to produce electronic images of probe 202 and the sample under test.

Figure 15B:
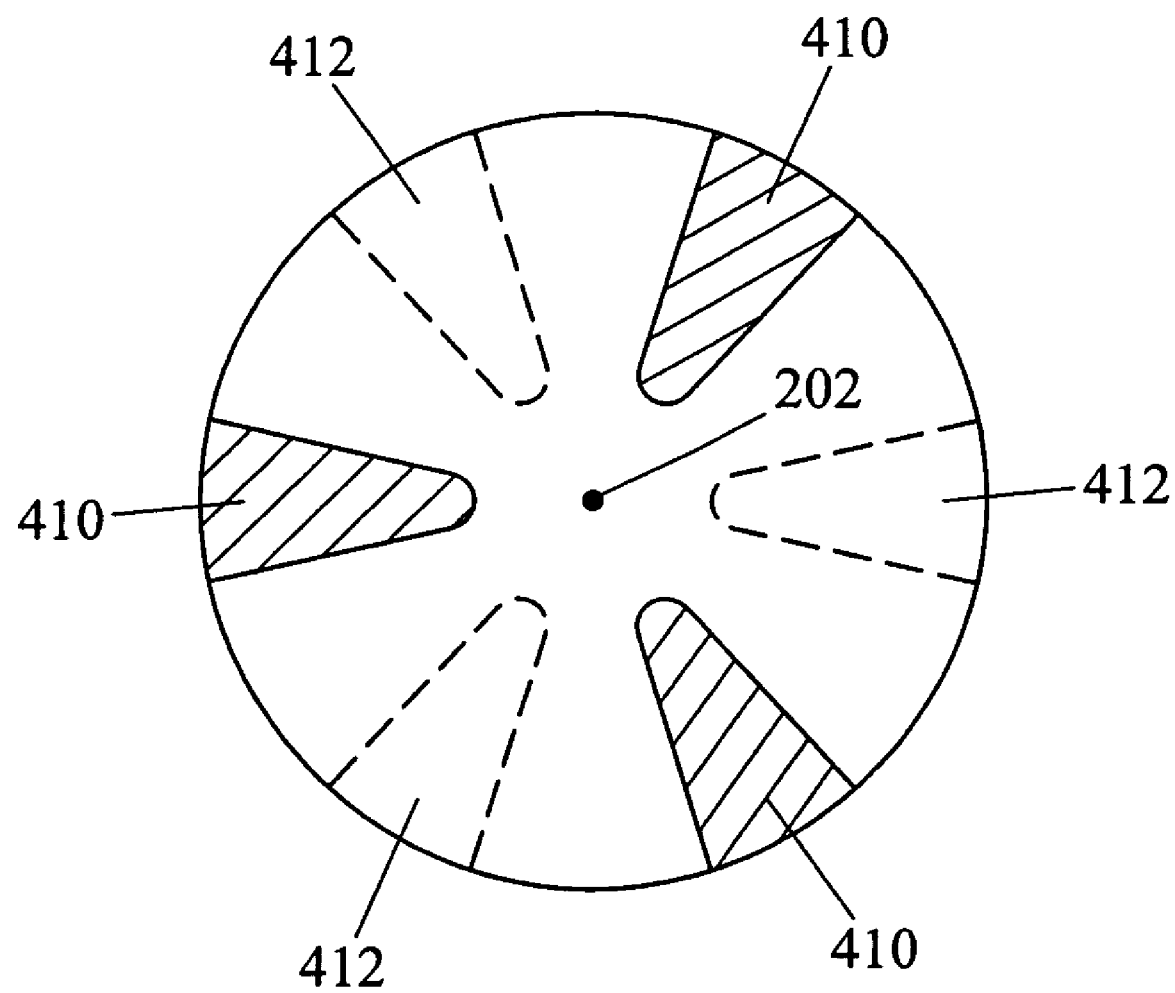
FIG. 15B is a top view illustrating magnetic pole pieces as viewed through an objective lens.

One problem with any magnetic pole and core assembly in which the pole pieces intrude in the optical path is that the pole pieces may adversely affect imaging and tracking because the pole pieces block light rays that would otherwise be collected by the objective lenses. FIG. 15B illustrates this concept. FIG. 15B is a schematic diagram illustrating an exemplary view of the system as seen through upper objective lens 1202. In FIG. 15B, upper pole pieces 410 appear as fuzzy opaque regions in the scene because they are out of focus. Lower pole pieces 412 also appear as out of focus images, since they are outside the focal length of objective lens 1202. In order to compensate for the effect of pole pieces 410 and 412 on imaging and tracking, the optical signal exiting lenses 1200 and 1202 can be post processed using a filter function to account for any distortion caused by the pole pieces. The filter function may be the inverse of the transfer function caused by the interference of pole pieces 410 and 412 on incident light. Such a transfer function may be experimentally determined and programmed into computer 204 illustrated in FIG. 2.

Tracking Optics

In order to control the position of a mechanically unattached probe in three dimensions, it is necessary to be able to track the probe in three dimensions. Additional reasons for and advantages of tracking the probe in three dimensions are that such tracking allows mapping of surfaces within a tracked volume, and when coupled with applied force measurements, viscoelastic properties of samples under test can be determined. For example, three-dimensional optical tracking while applying forces in three dimensions can be used to determine mechanical properties of structures within a cell, within a cell culture, or in any other biological sample. Selective binding of the probe to specific organelles and large macromolecules can be used to determine binding coefficients.

Figure 16:
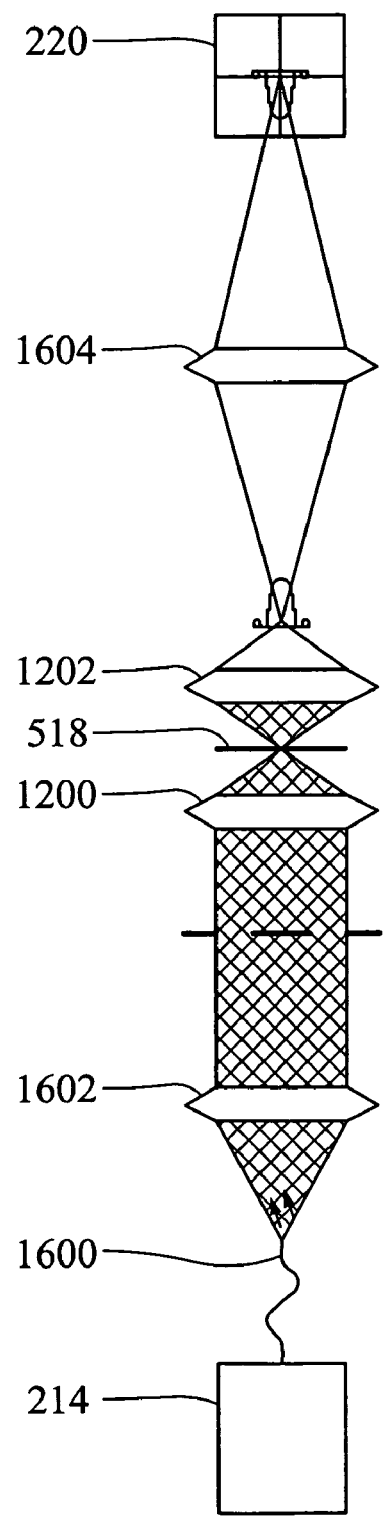
FIG. 16 is an optical schematic diagram illustrating exemplary tracking optics suitable for tracking motion of a mechanically unattached magnetic probe according to an embodiment of the present invention.

FIG. 16 illustrates exemplary tracking optics that may be used in a system for three dimensional tracking and position control of a free floating probe according to an embodiment of the present invention. In FIG. 16, the tracking optics include a laser light source 214 coupled to the remainder of the optics via a single mode optical fiber 1600. A collimating lens 1602 collimates the diverging light rays exiting fiber 1600. Condensing lens 1200 converges the light rays on the specimen sample 518. Objective lens 1202 collects the transmitted light beam and the light scattered from the probe on its back focal plane where it interferometrically forms the Fourier transform of the superposition of these two light fields. Lens 1604 reprojects the optical Fourier transform of the sample from the back focal plane of objective lens 1202 to quadrant photodiode 220. Quadrant photodiode 220 converts the light into electronic signals indicative of optical intensities at various positions on the surface of quadrant photodiode 220.

Optical Tracking Theory and Equations

Figure 17:
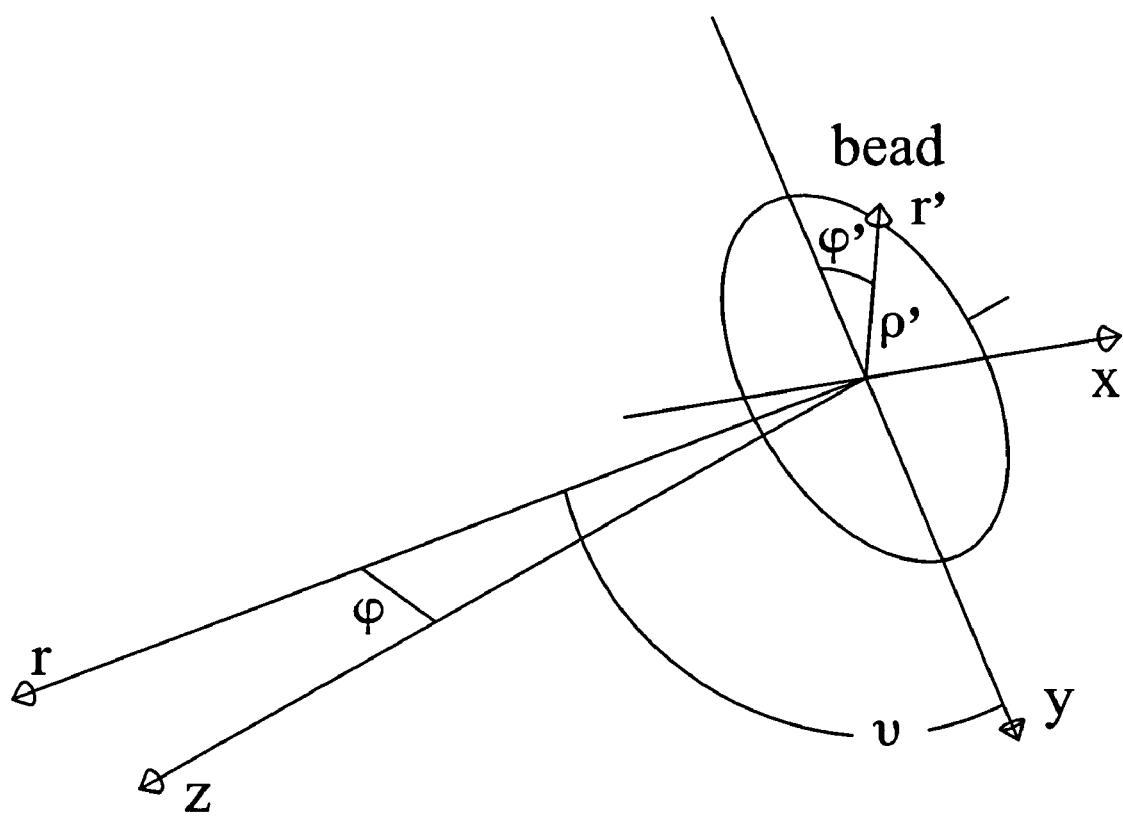
FIG. 17 is a perspective view illustrating exemplary coordinates and angles used in equations for tracking a mechanically unattached magnetic probe in three-dimensions according to an embodiment of the present invention.

Optical tracking equations based on intensity measurements made by quadrant photodiode 220 are theoretically based on Maxwell's Wave Equations. The following assumptions were made in order to perform the optical tracking calculations:

1. The probe acts like a Rayleigh scatterer (a dielectric sphere with a radius smaller than the wavelength of the incident light).
2. The finite size of the particle is accounted for, with a dielectric constant, $\epsilon$, and a polarizability, $\alpha$, $$\alpha = a^3 \eta_{solvent}^2 \cdot \frac{(m^2 - 1)}{(m^2 + 2)}$$

Where $$m = \frac{\eta_{probe}}{\eta_{solvent}}$$

and $\eta_{probe}$ and $\eta_{solvent}$ are the refractive indices of the probe and the solvent in which the probe is floating, and a is the radius of the probe. To simplify the math, the probe position r' is described in cylindrical coordinates z', $\rho'^2 = x'^2 + y'^2$, $\phi' = \text{atan}(y'/x')$, while the detected interference at point r is described in spherical coordinates (r, $\upsilon$, $\phi$) around the optical axis. FIG. 17 illustrates the spherical and cylindrical coordinates used in the probe position calculations.

3. The propagating electromagnetic field generated by the laser is modeled as a Gaussian beam with a scalar wavenumber k $k = |k| = 2\pi \eta_{solvent}/\lambda$ the radius of curvature of the Gaussian beam is $$R(z) = z\left[1 + \left(\frac{z_0}{z}\right)^2\right]$$

the beam waist radius in the focal plane is $$\omega_0 = \sqrt{\lambda \frac{z_0}{\pi}}$$

and the phase is $$\zeta(z) = \mathrm{atan}\left(\frac{z}{z_0}\right).$$

At the focus (i.e., the sample under test), the field generated by laser 214 undergoes the Gouy-phase jump, resulting in a ninety-degree phase shift between the focused laser field and a simple plane wave description of the phase of the light. The complex amplitude of the incident Gaussian electromagnetic field on the probe is given by $$E_i(r) = E_0 \frac{w_0}{w(z)} \exp\left[-\frac{\rho^2}{w^2(z)}\right] \exp\left[-ikz - ik\frac{\rho^2}{2r^2(z)} + i\zeta(z)\right] \quad (1)$$

When the field at quadrant photodiode 220 is observed, far from the focal plane ($r \gg z_0$), the following approximations can be used:

$$\zeta(z) = \arctan\left(\frac{z}{z_0}\right) \approx \frac{\pi}{2},\ z \approx r,\ R(z) \approx \infty$$

$$\omega(z) \approx \frac{\omega_0 z}{z_0},\ \sin(v) \approx v,\ \rho < \omega_0,\ \exp\left(-\frac{\rho^2}{\omega(z)^2}\right) \approx 1$$

the unscattered light in the far field is then given by $$E_u(r) = iE_0 \frac{k\omega_0}{2r}\exp\left[ikr - \frac{1}{4}k^2\omega_0^2 v^2\right], \quad (2)$$

and this is normalized by $$E_0 = \frac{2}{\left(\omega_0 \sqrt{\pi \varepsilon_s c_s}\right)},$$

where $c_s$ is the speed of light in the sample under test. When a probe with a polarizability $\alpha$, is placed at a position r', near the geometric focal point, the Rayleigh approximation for the scattered field at large $r \gg z_0$ is $$E_s(r, r') \approx \frac{k^2 \alpha}{r} E(r') \exp[ik|r - r'|] \quad (3)$$

The change in the average light intensity I, due to the interference between the incident laser beam and the scattered light (subtracting the offset $|E|^2$) is $$\delta I = \frac{\varepsilon_s c_s}{2}(|E + E'|^2 - |E|^2) \approx \varepsilon_s c_s \mathrm{Re}(EE')$$

Using equations (2) and (3), the intensity change in the back focal plane of objective 1202 for a probe displacement r', from the geometrical focal point of objective 1202 is $$\frac{\delta I(r, r')}{I_{tot}} = J(r, r')\sin\left[k(r - |r - r'| - z' - \frac{\rho'^2}{2R(z')} + \frac{\zeta(z')}{k}\right] \quad (4)$$

Where $$J(r, r') = \frac{2k^3\alpha}{\pi r^3}\left(1 + \left(\frac{z'}{z_0}\right)^2\right)^{-1/2} \exp\left[-\frac{\rho'^2}{\omega(z')^2} - k^2\omega_0^2\vartheta^2\right]$$

The z-signal is extracted from the total intensity at the back focal plane of lens 1202. Thus, equation (4) can be integrated over all angles to obtain the z-signal along the optical axis as:

$$\frac{I_z}{I}(z') = \frac{8k\alpha}{\pi \omega_0^2}\left(1 + \left(\frac{z'}{z_0}\right)^2\right)^{-\frac{1}{2}} \sin\left(\arctan\left(\frac{z'}{z_0}\right)\right) \quad (5)$$

Figure 18A:
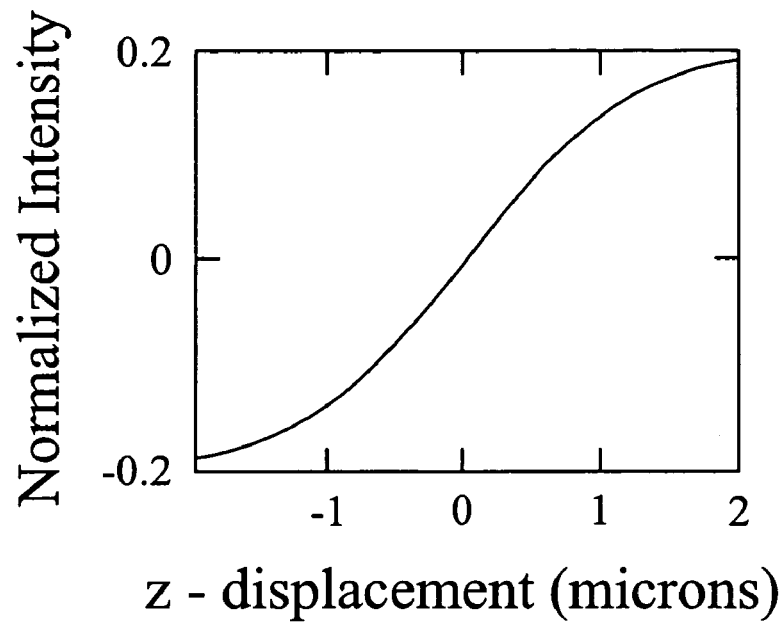
FIG. 18A is a graph of a linear profile of a normalized Z displacement signal generated by a system for tracking a mechanically unattached magnetic probe in three dimensions according to an embodiment of the present invention.

FIG. 18A is a graph of normalized intensity versus probe displacement in the Z direction (perpendicular to the surface of quadrant photodiode 220). The graph was generated assuming a 650 nm laser, a beam waist radius of 700 nm, a probe radius a=300 nm, and the refractive indices of the probe and the sample under test at 1.5 and 1.33, respectively. The result illustrated in Equation 5 and FIG. 18A is intuitive—as probe moves towards quadrant photodiode 220 in the Z direction, the normalized intensity increases and as the probe moves away from quadrant photodiode 220, the normalized intensity decreases. Thus, the change in intensity of the scattered and directly transmitted light measured by quadrant photodiode 220 can be used to track motion of probe 202 in the Z direction.

The lateral probe displacement (i.e., displacement in a plane parallel to the surface of QPD 220), may be determined by the difference in intensity between two halves of QPD 220. Thus, it is necessary to integrate half of the detection area to obtain the lateral signals. The two-dimensional result for a probe displacement, p', in the focal plane at an angle $\phi'$ is $$\frac{I_x}{I}(p', \varphi') = \frac{16k\alpha}{\sqrt{\pi\omega_0^2}}\cos(\varphi')\left(\frac{\rho'}{\omega_0}\right)\exp\left(-\left(\frac{\rho'}{\omega_0}\right)^2\right) \quad (6)$$

Figure 18B:
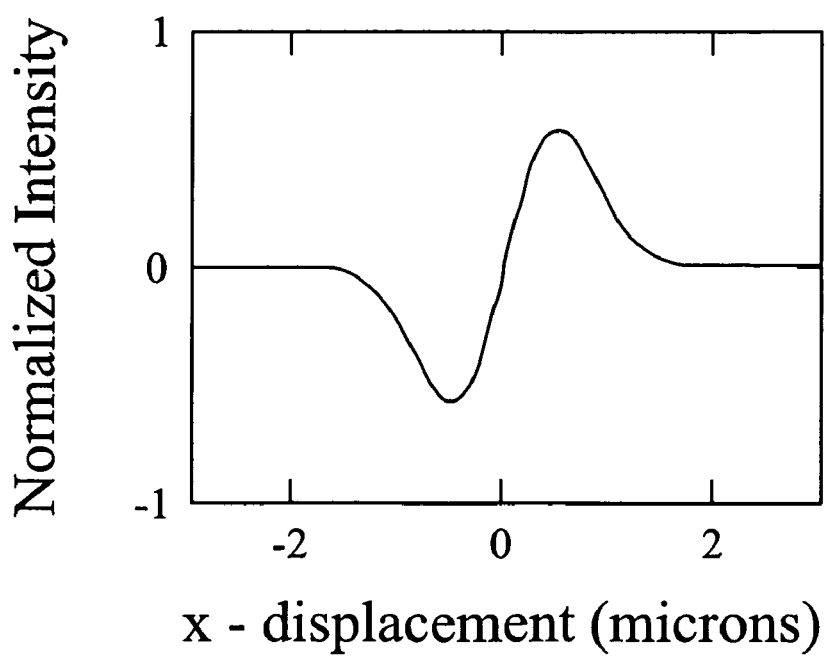
FIG. 18B is a graph of a linear profile of a normalized X displacement signal generated by a system for tracking a mechanically unattached magnetic probe in three dimensions according to an embodiment of the present invention.

FIG. 18B is a graph of normalized intensity versus displacement in the X direction generated by assuming the same laser, beam waist, beam radius, and probe and sample materials described above with regard to FIG. 18A. As illustrated in FIG. 18B, normalized intensity is zero for displacements to the far left and the far right of the center of quadrant photodiode 220. This is because light is being scattered outside of the image plane of quadrant photodiode 220. In the region near the center of quadrant photodiode 220, normalized intensity varies approximately sinusoidally with displacement. The results for displacement in the Y direction are similar to those illustrated in FIG. 18B for the X direction. Thus, by measuring the intensity and calculating the change in intensity of light measured by different regions of quadrant photodiode 220, motion of a mechanically unattached probe can be tracked in a plane parallel to the surface of quadrant photodiode 220.

Equations (5) and (6) or approximations of Equations (5) and (6) may be implemented as a position calculator in hardware and/or software in computer 204 illustrated in FIG. 2. Such a position calculator receives the signals output from quadrant photodiode 220 and calculates position, velocity, and/or acceleration of probe 202 in the sample under test.

Thus, the present invention includes methods and systems for controlling motion of and tracking a mechanically unattached probe. In one implementation, the invention includes a magnetic pole and coil assembly suitable for use in space-constrained environments, such as optical microscopes with high numerical aperture lenses. In order to effect motion of a mechanically unattached probe in three dimensions, upper and lower pole carriers may be patterned with a plurality of pole pieces. Upper and lower magnetic drive ring cores include coils that magnetize the pole pieces to apply magnetic force to the probe. The pole pieces may be manufactured using any suitable manufacturing technique for making thin magnetic materials in predetermined patterns. Examples of fabrication techniques include any semiconductor fabrication techniques or cutting the pole piece patterns from thin foils.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A system for controlling motion of and optically tracking a mechanically unattached magnetic probe, the system comprising:
   (a) a magnetic coil and pole assembly including at least one thin film or thin foil magnetic pole piece located on a light transmissive substrate and at least one magnetic coil being magnetically coupled to the pole piece for applying magnetic force to a mechanically unattached probe through the pole piece;
   (b) imaging and tracking optics located proximally to the pole piece for imaging a sample under test and tracking motion of the probe;
   (c) a position translation stage being mechanically coupled to a sample under test in which the probe resides; and
   (d) a computer coupled to the magnetic coil and pole assembly, the imaging and tracking optics, and the position translation stage for receiving position information regarding the probe and the position translation stage and for producing control signals for moving at least one of the probe and the position translation stage to maintain position of the probe within a predetermined volume.

2. The system of claim 1 wherein the magnetic coil and pole assembly includes first and second pole plates, each pole plate having a plurality of pole pieces located thereon.

3. The system of claim 2 wherein the pole pieces on the first plate are located in a first plane and the pole pieces on the second plate are located in a second plane parallel to the first plane.

4. The system of claim 3 wherein the pole pieces in the first plane include pole tips that form vertices of a equilateral triangle and wherein the pole pieces in the second plane include pole tips that form vertices of a second equilateral triangle located in the second plane.

5. The system of claim 4 wherein the first equilateral triangle is rotated at an angle of 60° with regard to the second equilateral triangle.

6. The system of claim 1 wherein the magnetic coil and pole assembly includes first and second magnetic pole pieces.

7. The system of claim 6 wherein the first and second magnetic pole pieces each have a peaked configuration.

8. The system of claim 6 wherein the computer is adapted to alternate polarities of the first and second magnetic pole pieces over time.

9. The system of claim 1 wherein the magnetic coil and pole assembly includes at least one magnetic core for providing a low reluctance path for magnetic flux.

10. The system of claim 9 wherein the magnetic core comprises a ring structure having a plurality of tabs located thereon and a plurality of magnetic coils being wound around the tabs.

11. The system of claim 1 wherein the imaging and tracking optics include a first objective lens located on a first side of the magnetic coil and pole assembly and a second objective lens located on a second side of the magnetic coil and pole assembly.

12. The system of claim 11 wherein at least one of the first and second objective lenses has a numerical aperture of at least one.

13. The system of claim 1 wherein the computer is adapted to simultaneously track and control the motion of the probe in three dimensions.

14. The system of claim 1 wherein the predetermined volume comprises a volume in which the imaging and tracking optics can track position of the probe.

15. The system of claim 1 wherein the computer is adapted to provide a desired position control signal to the stage to cause the sample under test to move in a desired position profile and wherein the computer is adapted to provide a probe position control signal to the magnetic coil and pole assembly for moving the probe according to a trajectory opposite that caused by moving the sample under test according to the desired position profile, thereby maintaining the probe within the predetermined volume.

16. The system of claim 1 wherein the computer is adapted to provide a desired force control signal to the magnetic coil and pole assembly for applying a desired magnetic force profile to the probe and wherein the computer is adapted to provide a position control signal to the stage for causing the sample under test to move in a trajectory opposite the trajectory of the probe during application of the magnetic force profile, thereby maintaining the probe within the predetermined volume.

17. The system of claim 1 wherein the computer is adapted to provide a desired velocity control signal to the stage for causing the sample under test to move according to a desired velocity profile and wherein the computer is adapted to provide a probe velocity control signal to the magnetic coil and pole assembly for causing the probe to move in a trajectory opposite the trajectory caused by application of the desired velocity profile, thereby maintaining the probe within the predetermined volume.

* * * * *

UNITED STATES PATENT AND TRADEMARK OFFICE
CERTIFICATE OF CORRECTION

PATENT NO. : 7,191,092 B2  
APPLICATION NO. : 11/440912  
DATED : March 13, 2007  
INVENTOR(S) : Vicci et al.

It is certified that error appears in the above-identified patent and that said Letters Patent is hereby corrected as shown below:

Col. 1, line 16 replace "This work was supported by NIH Grant Number 1R01EB000761-01. Thus, the U.S. Government has certain rights to this invention."

with --This invention was made with government support under Grant Nos. EB000761 and EB002025 awarded by the National Institutes of Health. The government has certain rights in the invention.--

Signed and Sealed this  
First Day of January, 2013

David J. Kappos  
*Director of the United States Patent and Trademark Office*